(No Model.)
J. W. BRADY.
BROILER.
No. 480,316. Patented Aug. 9, 1892.
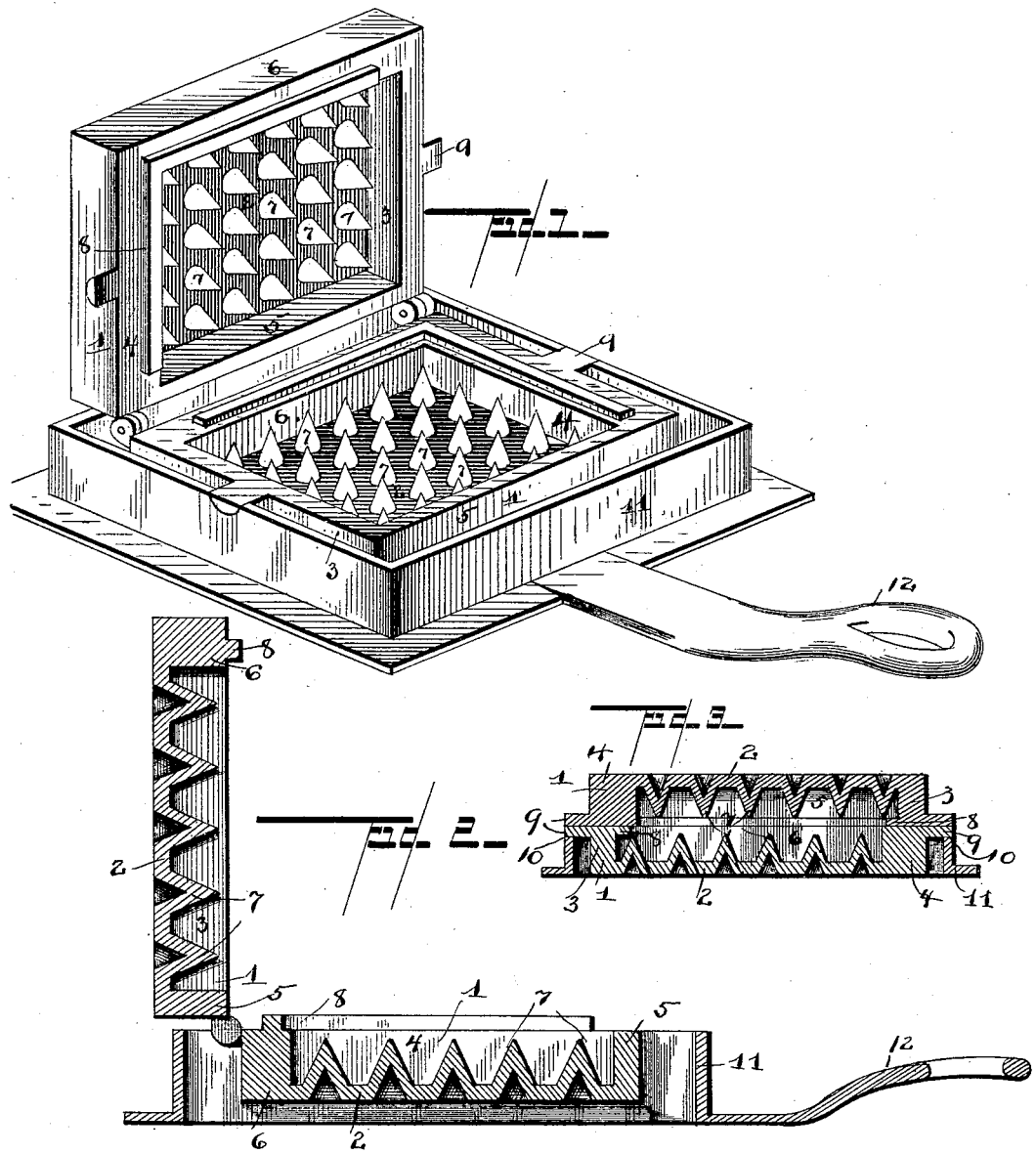
Witnesses
Inventor
James William Brady
By his Attorneys,

UNITED STATES PATENT OFFICE.

JAMES WILLIAM BRADY, OF BARTOW, FLORIDA.

BROILER.

SPECIFICATION forming part of Letters Patent No. 480,316, dated August 9, 1892.

Application filed July 23, 1891. Renewed July 9, 1892. Serial No. 439,479. (No model.)

*To all whom it may concern:*

Be it known that I, JAMES WILLIAM BRADY, a citizen of the United States, residing at Bartow, in the county of Polk and State of Florida, have invented a new and useful Broiler, of which the following is a specification.

The invention relates to improvements in broilers.

The object of the present invention is to simplify and improve the construction of broilers and to provide one which will thoroughly and quickly cook meat and retain the flavor of the same.

The invention consists in the construction and novel combination and arrangement of parts hereinafter fully described, illustrated in the accompanying drawings, and pointed out in the claim hereto appended.

In the drawings, Figure 1 is a perspective view of a broiler constructed in accordance with this invention and shown partly open. Fig. 2 is a sectional view showing the broiler open. Fig. 3 is a sectional view, the parts being closed.

Referring to the accompanying drawings, 1 1 designate sections of a broiler, which sections are rectangular and are dish-shaped and have their cavities arranged opposite each other and consist of bottoms 2, side walls 3 and 4, and end walls 5 and 6. The bottoms 2 are provided on their inner opposed faces with inwardly-projecting conical teeth 7, which are hollowed from the outside of the broiler and have sharp apexes adapted to pierce a piece of meat from both sides, and the hollowed or concaved faces greatly increase the heating-surface and enable meat to be quickly and thoroughly cooked. By piercing the meat in this manner the interior of the meat is cooked simultaneously with the exterior. Each section has thin side and end walls 3 and 5 and thick side and end walls 4 and 6. The thin walls of one section are arranged to close against the thick walls of the opposite sections, and vice versa, and on the thick walls of each section is arranged an L-shaped flange 8, which is adapted to fit within the sections against the inner faces of the thinner walls, whereby a continuous tight joint is formed which will prevent the escape of the flavor of meat and will retain the steam and gravy within the broiler. The sections are provided at their sides with pivots 9, which are journaled in bearings 10 of a rectangular frame 11, and the broiler is adapted to be rotated in the frame to bring either section at the bottom, so that meat may be readily turned to cook on both sides. The rectangular frame 11 is provided with a handle 12.

It will be seen that the broiler is simple, inexpensive, strong, and durable and adapted to quickly and thorougly cook meat and to retain the flavor within the same.

What I claim is—

A broiler comprising the rectangular dish-shaped sections hinged together and provided with side pivots and having thin walls 3 and 5 and thick walls 4 and 6, the thin walls of one section being arranged opposite the thick walls of the other section, the conical hollow teeth extending inward from the bottom of the sections, the L-shaped flanges 8, arranged in the faces of the thick walls and adapted when the sections are closed to fit against the inner faces of the thin walls, whereby a continuous tight joint is effected, and the rectangular frame provided with bearings to receive the said pivots, substantially as described.

In testimony that I claim the foregoing as my own I have hereto affixed my signature in presence of two witnesses.

JAMES WILLIAM BRADY.

Witnesses:
C. F. FERNALD,
A. B. FERGUSON.